(12) United States Patent
Kim et al.

(10) Patent No.: US 7,291,424 B2
(45) Date of Patent: Nov. 6, 2007

(54) POSITIVE ELECTRODE FOR LITHIUM-SULFUR BATTERY AND LITHIUM-SULFUR BATTERY FABRICATED USING SAME

(75) Inventors: Seok Kim, Incheon (KR); YongJu Jung, Suwon (KR); Ji-Seong Han, Suwon (KR); Jan-Dee Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 458 days.

(21) Appl. No.: 10/429,824

(22) Filed: May 6, 2003

(65) Prior Publication Data
US 2004/0009396 A1    Jan. 15, 2004

(30) Foreign Application Priority Data
Jul. 10, 2002 (KR) ............. 10-2002-0040007

(51) Int. Cl.
*H01M 4/58* (2006.01)
(52) U.S. Cl. ............. 429/218.1; 429/232; 429/231.95
(58) Field of Classification Search ........... 429/215, 429/232, 245, 218.1, 231.95
See application file for complete search history.

(56) References Cited

U.S. PATENT DOCUMENTS

| | | | | |
|---|---|---|---|---|
| 5,919,587 A | * | 7/1999 | Mukherjee et al. | 429/213 |
| 6,110,619 A | * | 8/2000 | Zhang et al. | 429/213 |
| 6,238,821 B1 | * | 5/2001 | Mukherjee et al. | 429/213 |
| 6,358,643 B1 | * | 3/2002 | Katz et al. | 429/105 |
| 6,402,795 B1 | | 6/2002 | Chu et al. | |
| 6,589,299 B2 | | 7/2003 | Missling et al. | |
| 6,878,487 B2 | * | 4/2005 | Cho et al. | 429/231.95 |
| 7,147,968 B2 | * | 12/2006 | Han et al. | 429/218.1 |

FOREIGN PATENT DOCUMENTS

| | | |
|---|---|---|
| JP | 07-029605 | 1/1995 |
| JP | 08-298135 | 11/1996 |
| JP | 10-106585 | 4/1998 |
| JP | 11-329414 | 11/1999 |
| JP | 2000-123824 | 4/2000 |
| JP | 2002-504741 | 2/2002 |
| JP | 2003-142097 | 5/2003 |
| JP | 2004-521453 | 7/2004 |
| WO | WO 99/43034 | 8/1999 |
| WO | WO 02/065563 | 8/2002 |

OTHER PUBLICATIONS

Abstract of WO 2001057943 which claims priority to US 2000-495639 (US 6,358,643).*

* cited by examiner

*Primary Examiner*—Laura Weiner
(74) *Attorney, Agent, or Firm*—Stein, McEwen & Bui, LLP

(57) ABSTRACT

A positive electrode for a lithium-sulfur battery includes a positive active material, a binder, a conductive agent, and a surfactant.

3 Claims, 5 Drawing Sheets

POSITIVE ELECTRODE FOR LITHIUM-SULFUR BATTERY AND LITHIUM-SULFUR BATTERY FABRICATED USING SAME

CROSS-REFERENCE TO RELATED APPLICATIONS

This application is based on application No. 2002-40007, filed in the Korean Intellectual Property Office on Jul. 10, 2002, the disclosure of which is incorporated herein by reference.

BACKGROUND OF THE INVENTION

1. Field of the Invention

The present invention relates to a positive electrode for a lithium-sulfur battery and a lithium-sulfur battery, and more particularly, to a positive electrode for a lithium-sulfur battery which can provide a lithium-sulfur battery exhibiting effective energy density and long cycle life characteristics.

2. Description of the Related Art

The development of portable electronic devices has led to a corresponding increase in the demand for secondary batteries having both a lighter weight and a higher capacity. To satisfy these demands, the most promising approach is a lithium-sulfur battery with a positive electrode made of sulfur-based compounds.

With respect to specific density, the lithium-sulfur battery is the most attractive among the currently developing batteries since lithium has a specific capacity of 3,830 mAh/g, and sulfur has a specific capacity of 1,675 mAh/g. Further, the sulfur-based compounds are less costly than other materials and are environmentally friendly.

Lithium-sulfur batteries use sulfur-based compounds with sulfur-sulfur bonds as a positive active material, and a lithium metal or a carbon-based compound as a negative active material. The carbon-based compound is one which can reversibly intercalate or deintercalate metal ions, such as lithium ions. Upon discharging (i.e., electrochemical reduction), the sulfur-sulfur bonds are cleaved, resulting in a decrease in the oxidation number of sulfur (S). Upon recharging (i.e., electrochemical oxidation), the sulfur-sulfur bonds are reformed, resulting in an increase in the oxidation number of the S. The electrical energy is stored in the battery as chemical energy during charging, and it is converted back to electrical energy during discharging.

Sulfur reacts with lithium metal to convert lithium sulfide or lithium polysulfide in the lithium-sulfur battery. The theoretical final oxidation state of sulfur is $S_8$ and the final reduction state is $Li_2S$. When $S_8$ is completely reduced to $Li_2S$ (100% utilization), the lithium-sulfur battery exhibits the nominal capacity pf 1675 mAh/g, which is the highest energy density of all batteries.

A positive active material composition is produced by mixing a positive active material, a binder and a conductive agent in a solvent to prepare a positive active material composition, and coating the composition on a current collector. However, it is easy for the positive active material, the conductive agent, and the binder to coagulate in the solvent, thus causing a phase separation. Such a phenomenon causes an uneven surface to form on the positive electrode, thus decreasing the reactive surface area, which deteriorates energy density and cycle life characteristics.

SUMMARY OF THE INVENTION

It is an aspect of the present invention to provide a positive electrode for a lithium-sulfur battery produced by using a composition in which a positive active material, a conductive material and a binder are well distributed in a solvent.

It is another aspect to provide a lithium-sulfur battery fabricated using the positive electrode.

These and other aspects may be achieved by a positive electrode for a lithium-sulfur battery that includes a positive active material, a binder, a conductive agent, and a surfactant.

In order to achieve these aspects and others, the present invention provides a lithium-sulfur battery that includes the positive electrode, a negative electrode, and an electrolyte.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
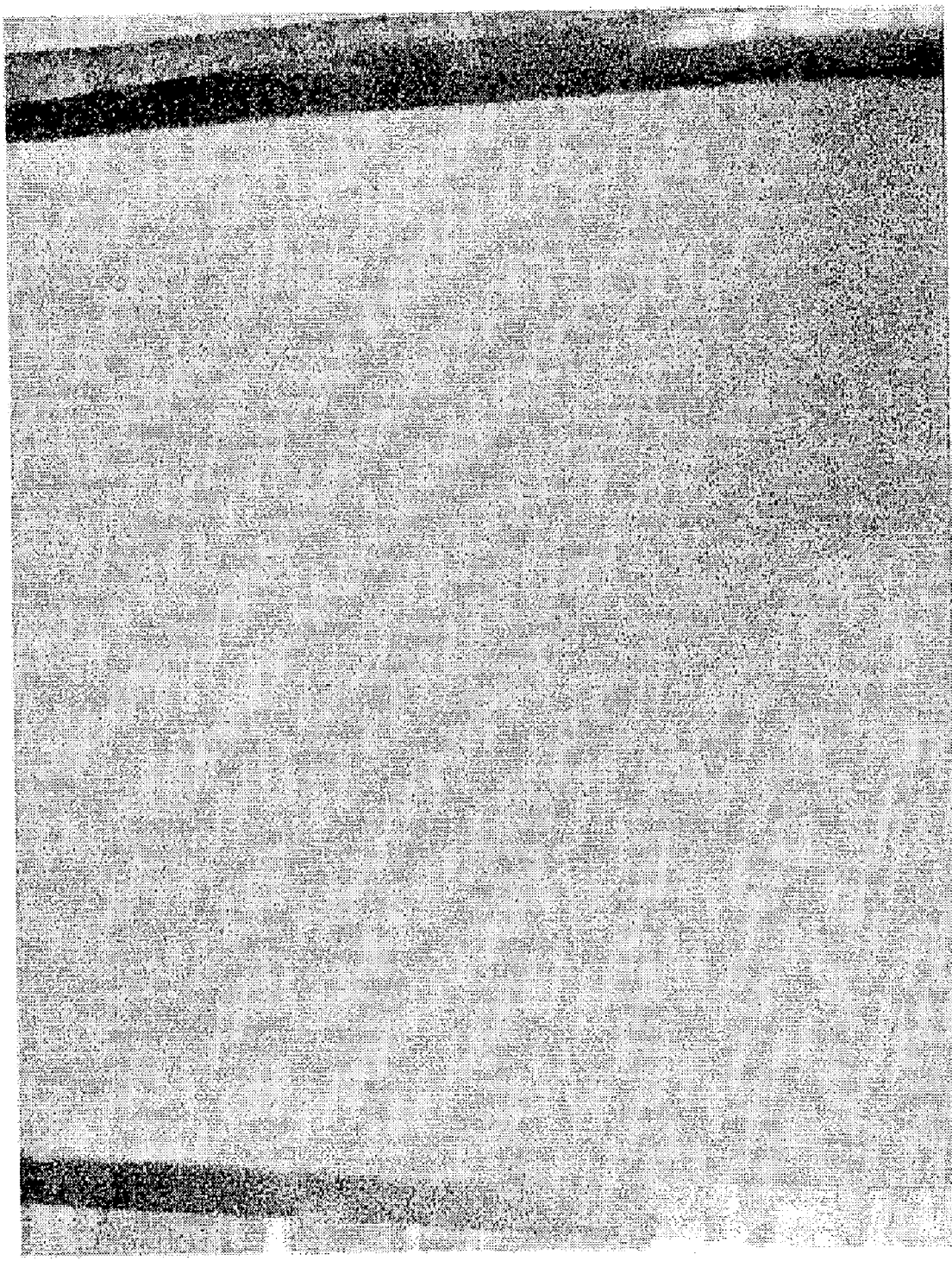
FIG. 1 is a SEM photograph of a positive electrode for a lithium-sulfur battery of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

A positive electrode of an embodiment of the present invention is produced by using a new positive active material composition. The new composition includes a surfactant in addition to the conventional composition including a positive active material, a binder, a conductive agent, and a solvent.

The surfactant acts as a distribution agent and decreases viscosity (that is, the surfactant acts as an agent for controlling viscosity). Thus, the surfactant helps to distribute the positive active material, the binder, and the conductive agent in the solvent, and to prevent coagulation, which causes formation of a mass. In addition, the surfactant increases ionic conductivity. Accordingly, the surfactant prevents shortcomings related to coagulation, thus improving energy density and cycle life characteristics. Furthermore, the surfactant may act as a binder to increase adhesion of the positive active material composition.

The surfactant is preferably an oligomer or a polymer with a weight-average molecular weight of 100 to 100,000, and preferably, 500 to 10,000. If the weight-average molecular weight of the surfactant exceeds 100,000, viscosity increases, causing coagulation, and if the average molecular weight is less than 100, the desired effect cannot be realized.

The surfactant may be a cationic, anionic, or nonionic surfactant. Examples of the cationic surfactant may be amine salts, quaternary ammonium salts, amino amides or amidazolines. Examples of the anionic surfactant may be carboxylic acids, sulfuric acid esters or sulfonic acids. Examples of the nonionic surfactant may be ammonium salts of polyacrylic acid, alkyl, alkyl-aryl ethers, thioethers, esters, or amides. The nonionic surfactant may also comprise oligomers or polymers represented by the following Formula 1 or oligomers or polymers represented by the following Formula 2.

(1)

(wherein n is 1 to 50)

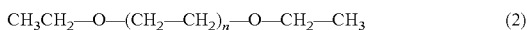
(2)

(wherein n is 1 to 50)

In Formulas 1 and 2, if n exceeds 50, the surface tension of the surfactant is too low, and the viscosity is too high, so that the positive active material composition is adversely effected.

The surfactant is presented in the positive active material composition in the amount of 0.1 to 10 wt %, and preferably 1 to 5 wt %. If the amount of the surfactant is less than 0.1 wt % based on the weight of the positive active material, the distribution deteriorates. If the amount of the surfactant is more than 10 wt %, the amount of positive active material is relatively reduced.

The positive active material may be elemental sulfur ($S_8$), $Li_2S_n (n \geq 1)$, an organicsulfur compound or a carbon-sulfur polymer.

The conductor includes an electrical conductor that facilitates the movement of electrons within the positive electrode. Examples of the conductive material include, but are not limited to, a conductive material such as a graphite-based material, a carbon-based material, and a conductive polymer. The graphite-based material includes KS 6 (available from TIMCAL CO.); and the carbon-based material includes SUPER P (available from MMA Co.), ketjen black, denca black, acetylene black, or carbon black. The conductive polymer includes polyaniline, polythiophene, polyacetylene, or polypyrrol, or a combination thereof.

A binder may be added to adhere the positive active material on a current collector. The binder may be poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (Trademark: KYNAR), polyethyl acrylate, polytetrafluoroethylene, polyvinyl chloride, polyacrylonitrile, polyvinyl pyridine, polystyrene, derivatives thereof, blends thereof, or copolymers thereof.

The amount of the conductive agent is 5 to 20 wt %, the amount of the positive active material is 60 to 90 wt %, and the amount of the binder is 5 to 20 wt % of the positive active material composition.

The organic solvent may be any solvent as long as the solvent is capable of homogeneously dispersing the positive active material, the binder, and the conductor. Useful solvents include acetonitrile, methanol, ethanol, tetrahydrofurane, water, or isopropyl alcohol.

The positive active material composition has a sufficient viscosity of 500 to 5000 cps to coat the composition on a current collector. If the viscosity of the positive active material composition is less than 500, the composition is difficult to coat on the current collector, and if the viscosity of the positive active material composition is more than 5000, the composition is also difficult to coat on the current collector and tends to form a gel easily.

A positive electrode is produced by coating the positive active material composition on a current collector. The current collector is not limited, but preferably comprises a conductive material such as stainless steel, aluminum, copper, or titanium. It is more preferable to use a carbon-coated aluminum current collector. The carbon-coated aluminum current collector has excellent adhesive properties to the coated layer that includes positive active materials, shows a lower contact resistance, and inhibits corrosion by a polysulfide compared with a bare aluminum current collector.

The positive electrode of the present invention has a smooth surface and an increased electrochemical reactive surface area, thus providing a lithium-sulfur battery exhibiting high energy density and improved cycle life characteristics.

The following examples illustrate the present invention in further detail, but it is understood that the present invention is not limited by these examples.

EXAMPLE 1

Elemental sulfur ($S_8$), ketjen black (MITSUBISHI), a polyvinylidene fluoride latex binder and a polyethylene glycol dimethyl ether (weight-average molecular weight 2000) surfactant were uniformly mixed in an aqueous solution of acrylonitrile to prepare a slurry. The mixing ratio of the elemental sulfur, ketjen black, and the latex binder was 60:20:20 by weight, and the amount of the surfactant was 2.5 wt % based on the elemental sulfur.

Figure 6:
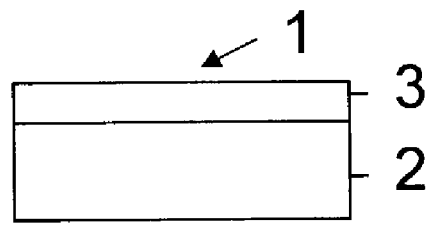
FIG. 6 is a block diagram (not to scale) of a positive electrode in accordance with an embodiment of the present invention.

As illustrated in the block diagram of FIG. 6, the slurry 3 was coated on a carbon-coated Al current collector 2, and the coated collector was dried to produce a positive electrode 1.

Figure 7:
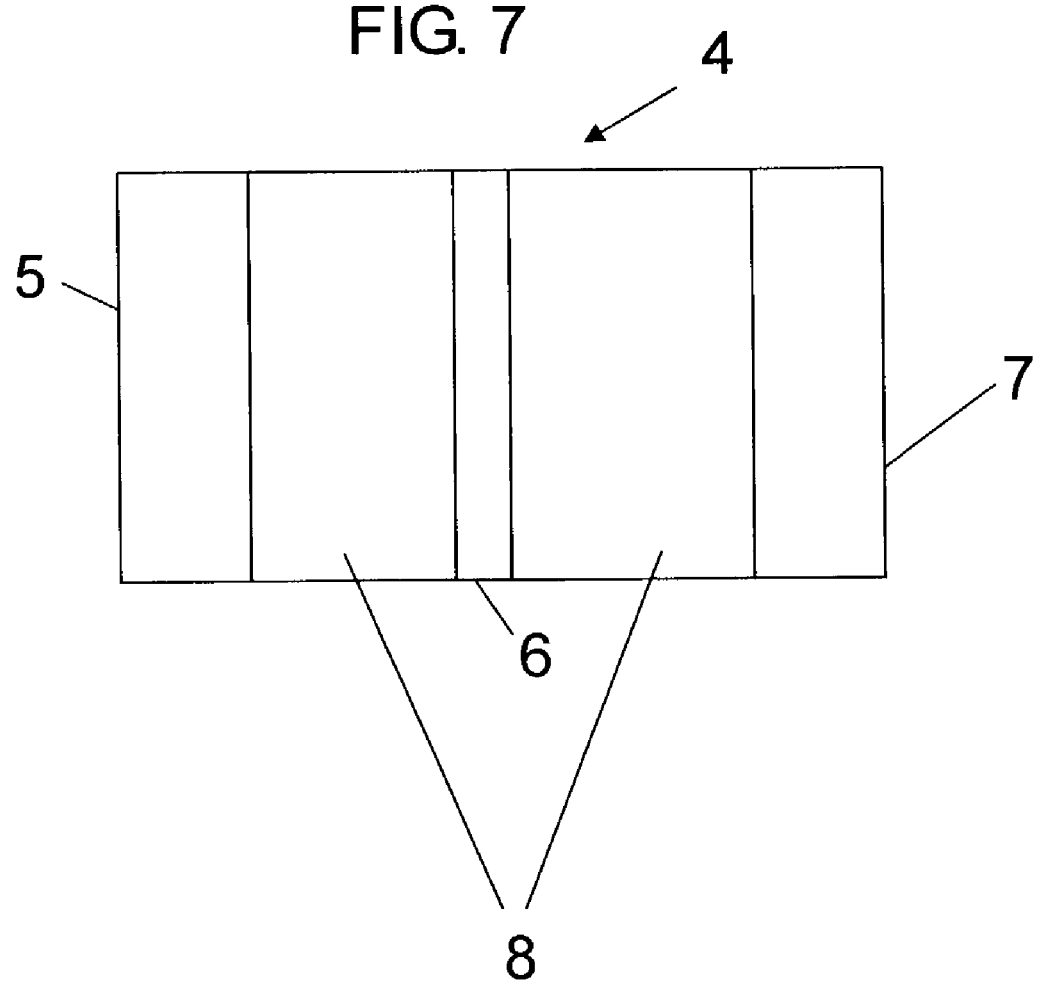
FIG. 7 is a block diagram (not to scale) of a lithium-sulfur battery in accordance with an embodiment of the present invention.

As illustrated in the block diagram of FIG. 7, using the positive electrode 5, a lithium foil negative electrode 7, a polypropylene separator 6, and an electrolyte 8, a lithium-sulfur cell 4 was fabricated in a dry room. The electrolyte was 1 M $LiSO_3CF_3$ in a mixed solvent of 1,3-dioxolane/diglyme/sulforane/dimethoxy ethane (5:2:1:2 volume ratio).

EXAMPLE 2

A positive electrode was produced by the same procedure as in Example 1, except that a polyoxyethylene lauryl ether (Trademark: BRIJ® 30, number average molecular weight: 362) surfactant was used.

EXAMPLE 3

A positive electrode was produced by the same procedure as in Example 1, except that a polyoxyethylene sorbitan trioleate (Trademark: TWEEN® 85, number average molecular weight: 1839) surfactant was used.

EXAMPLE 4

A positive electrode was produced by the same procedure as in Example 1, except that a sorbitan monostearate (Trademark: SPAN 60®, molecular weight: 431) surfactant was used.

COMPARATIVE EXAMPLE 1

60 wt % of elemental sulfur ($S_8$), 20 wt % of ketjen black (MITSUBISHI), and 20 wt % of polyvinylidene fluoride were uniformly mixed in an aqueous solution of acrylonitrile to prepare a slurry.

The slurry was coated on a carbon-coated Al current collector, and the coated collector was dried to produce a positive electrode.

Using the positive electrode, a lithium foil negative electrode, a polypropylene separator, and an electrolyte, a lithium-sulfur cell was fabricated in a dry room. The electrolyte was 1 M $LiSO_3CF_3$ in a mixed solvent of 1,3-dioxolane/diglyme/sulforane/dimethoxy ethane (5:2:1:2 volume ratio).

Photographs

Figure 2:
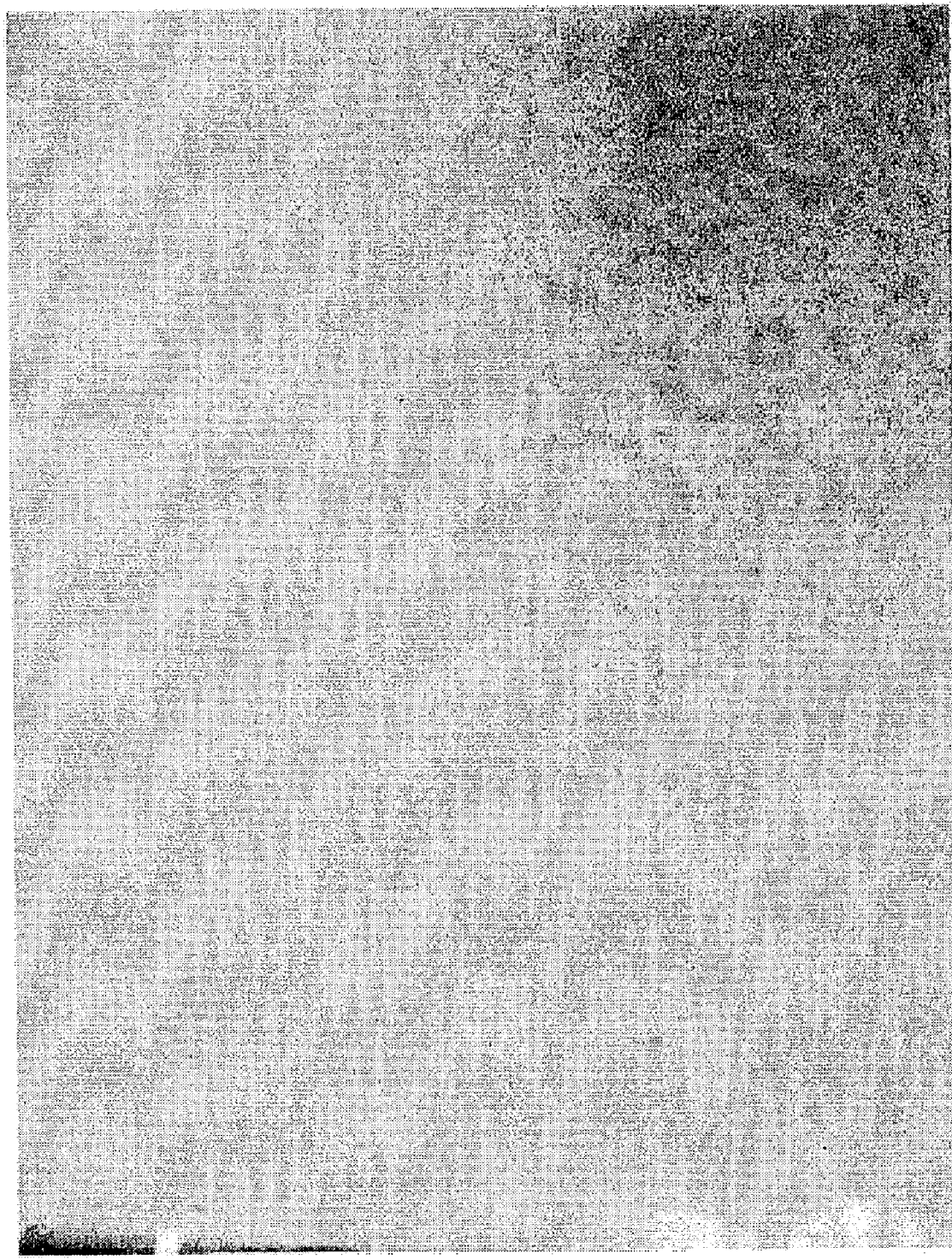
FIG. 2 is a SEM photograph of a conventional positive electrode for a lithium-sulfur battery.

Photographs of the positive electrodes according to Example 1 and Comparative Example 1 are shown in FIGS. 1 and 2, respectively. As shown in FIGS. 1 and 2, the positive electrode according to Example 1 using the surfactant has a smooth surface, whereas that according to Comparative Example 1 without the surfactant has an uneven surface.

Cycle Life Characteristics

Figure 3:
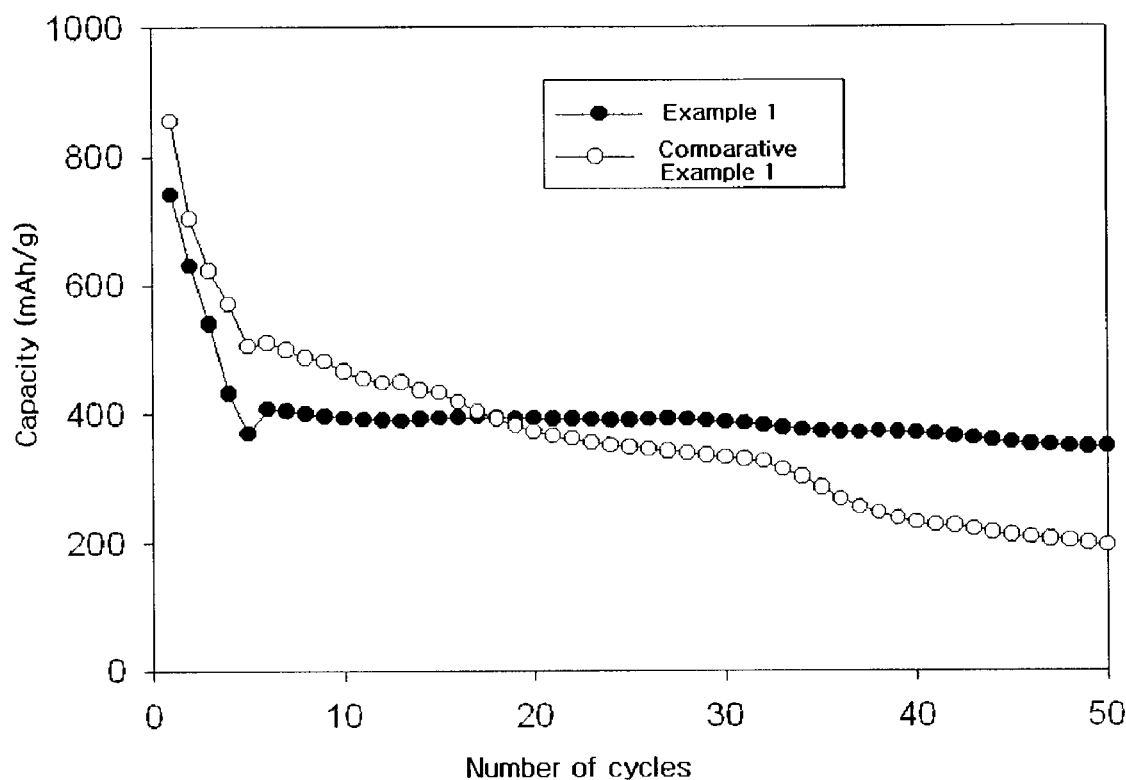
FIG. 3 is a graph showing cycle life characteristics of the cells according to Example 1 of the present invention and Comparative Example 1.

The cycle life characteristics of the cells according to Example 1 and Comparative Example 1 were measured, and the results are presented in FIG. 3. It is evident from FIG. 3 that the cell according to Example 1 has a slightly lower initial capacity than a cell according to Comparative Example 1, but the cell according to Example 1 has surprisingly higher capacity retention than that according to Comparative Example 1 during 50 charge and discharge cycles. That is, the cell according to Example 1 has excellent cycle life characteristics compared with the cell of Comparative Example 1.

Figure 4:
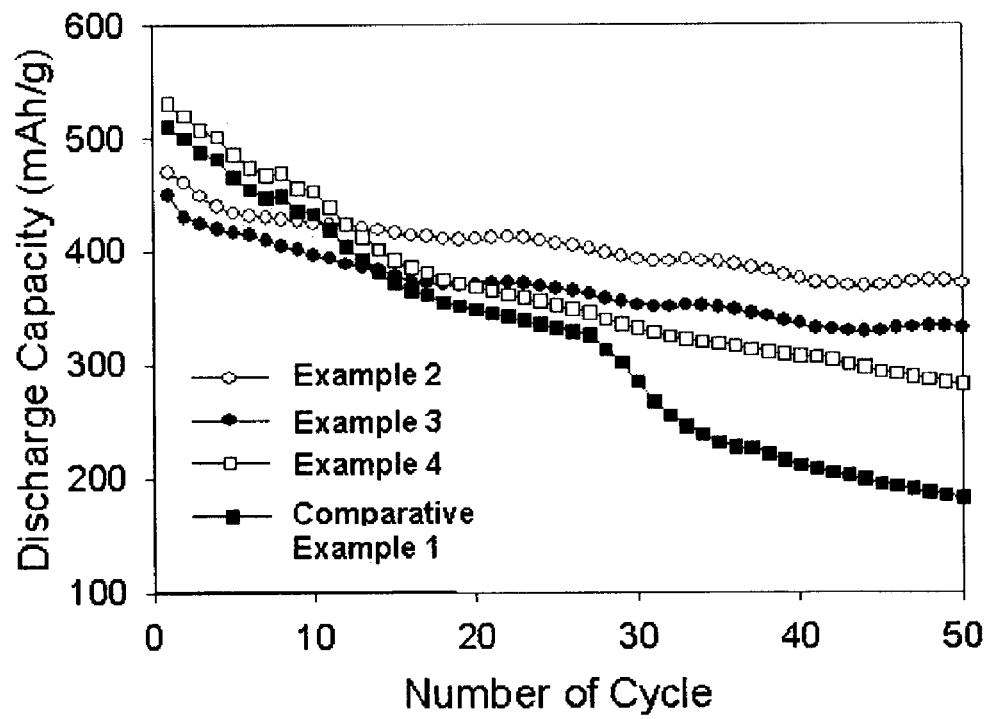
FIG. 4 is a graph showing cycle life characteristics of the cells according to Examples 2 to 4 of the present invention and Comparative Example 1.

In addition, the cycle life characteristics of the cells according to Examples 2 to 4 and Comparative Example 1 were measured, and the results are presented in FIG. 4. FIG. 4 shows that the cells according to Examples 2 to 4 have excellent cycle life characteristics compared with the cell of Comparative Example 1.

Energy Density

Figure 5:
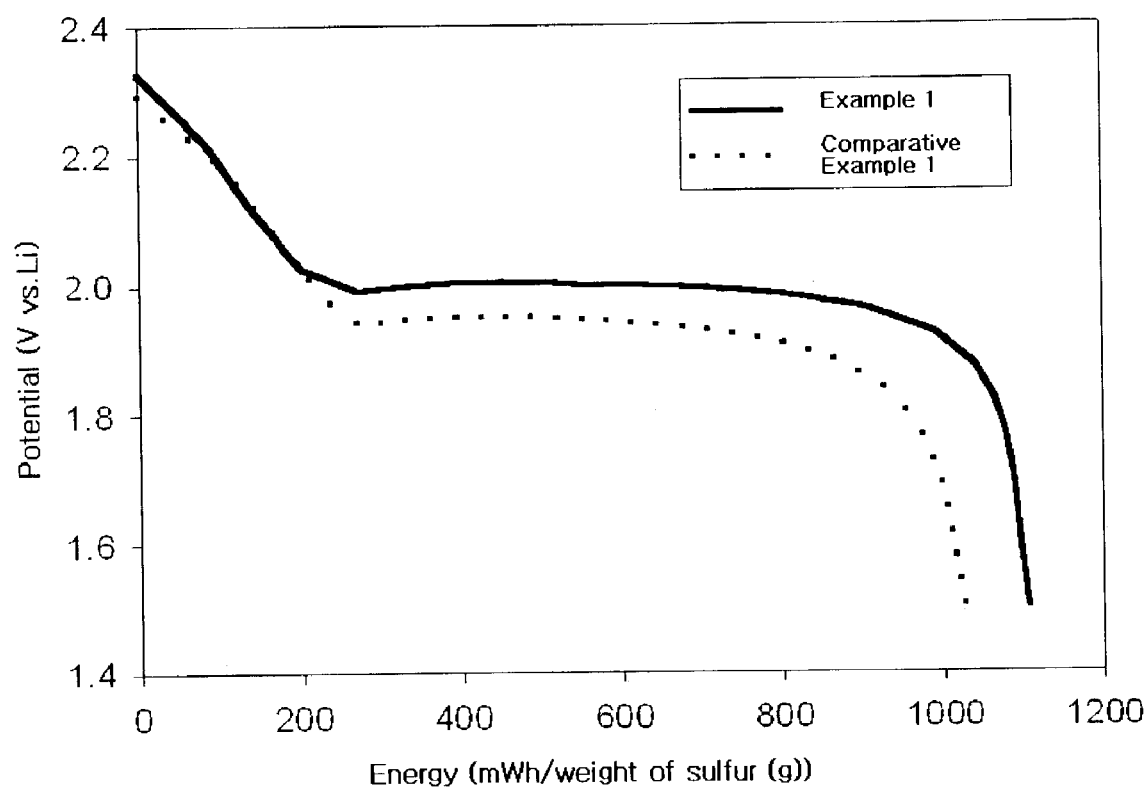
FIG. 5 is a graph showing energy densities of the cells according to Example 1 of the present invention and Comparative Example 1.

The energy density per weight of the active materials of the cells according to Example 1 and Comparative Example 1 was measured by discharging the cells at a current density of 1 mA/cm². The results are presented in FIG. 5. FIG. 5 indicates that the cell according to Example 1 has good energy density compared with the cell of Comparative Example 1.

The results in FIGS. 3 to 5 are believed to come about because the surfactant used in Example 1 causes a smooth surface to form on the positive electrode, thus increasing the reactive surface as compared with Comparative Example 1.

The surfactant of the present invention helps to distribute a positive active material, a conductive agent and a binder uniformly in a solvent so that the positive active material of the present invention has a smooth surface, and provides a lithium-sulfur battery exhibiting effective energy density and cycle life characteristics.

While the present invention has been described in detail with reference to the preferred embodiments, those skilled in the art will appreciate that various modifications and substitutions can be made thereto without departing from the spirit and scope of the present invention as set forth in the appended claims.

Although a few preferred embodiments of the present invention have been shown and described, it would be appreciated by those skilled in the art that changes may be made in this embodiment without departing from the principles and spirit of the invention, the scope of which is define in the claims and their equivalents.

What is claimed is:

1. A positive electrode for a lithium-sulfur battery comprising:
    a positive active material comprising sulfur or a sulfur-based compound;
    a binder;
    a conductive agent; and
    a surfactant, wherein the surfactant is an oligomer or a polymer represented by the following Formula 2:

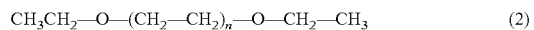
    $$CH_3CH_2-O-(CH_2-CH_2)_n-O-CH_2-CH_3 \quad (2)$$

(wherein n is 1 to 50).

2. A lithium-sulfur battery comprising:
    a positive electrode comprising a positive active material, a binder, a conductive agent, and a surfactant, the positive active material comprising sulfur or a sulfur-based compound;
    a negative electrode;
    an electrolyte; and
    a separator,
    wherein the surfactant is an oligomer or a polymer represented by the following Formula 2:

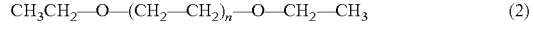
    $$CH_3CH_2-O-(CH_2-CH_2)_n-O-CH_2-CH_3 \quad (2)$$

(wherein n is 1 to 50).

3. A positive electrode for a lithium-sulfur battery comprising:
    a positive active material comprising sulfur or a sulfur-based compound;
    a binder;
    a conductive agent; and
    a surfactant,
    wherein the surfactant is a polyethylene glycol dimethyl ether surfactant and is approximately 1 to 5 wt % based on the weight of the positive active material.

* * * * *